Aug. 16, 1938. W. KIND ET AL Re. 20,826
SPRAYER EMPLOYED IN WATERING AREAS OF LAND
Original Filed Dec. 31, 1931
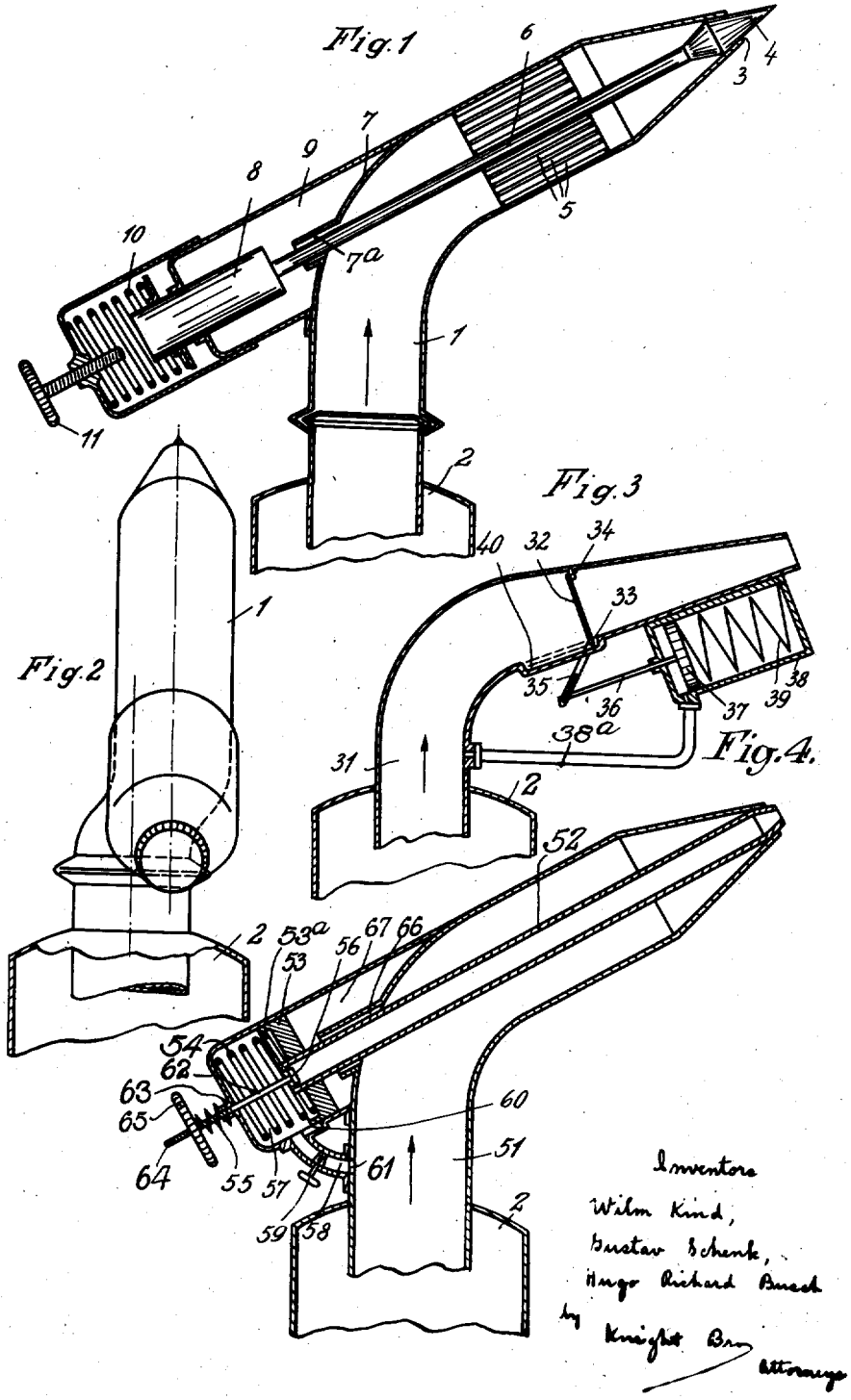
Inventors
Wilm Kind,
Gustav Schenk,
Hugo Richard Busch
by Knight Bros
Attorneys Reissued Aug. 16, 1938 Re. 20,826

UNITED STATES PATENT OFFICE 20,826

SPRAYER EMPLOYED IN WATERING AREAS OF LAND

Wilm Kind, Berlin-Haselhorst, Gustav Schenk, Brunswick, and Hugo Richard Busch, Wetzlar, Germany, assignors to Siemens-Schuckertwerke Aktiengesellschaft, Berlin-Siemensstadt, Germany, a corporation of Germany Original No. 1,984,531, dated December 18, 1934, Serial No. 584,142, December 31, 1931. Application for reissue December 12, 1936, Serial No. 115,644. In Germany January 6, 1931

24 Claims. (Cl. 299—25)

Our invention relates to sprayers employed in watering areas of land, and more particularly to a sprayer control for a periodical water delivery.

Our invention consists in the employment of a closure for the discharge outlet of a nozzle of a sprayer of the aforesaid type, said closure being provided with a cross-sectional area exposed to a pressure tending to close it and connected to a pressure responsive member tending to open it which has an effective cross-section greater than that of the closure. Owing to the design of the shut-off and pressure responsive control members which are under the influence of the pressure of the liquid, a rapid opening and closing of the shut-off member at sudden blows will be brought about without necessitating for this purpose other regulating devices. The pressure at which the water delivery takes place, depends upon the ratio of the cross-sectional areas of closure and pressure-responsive members respectively upon which the fluid acts and in connection with a pressure accumulator represented preferably by an air-trapping chamber in which the spraying fluid is received. The speed at which the control is effected during the opening of the closure may be, according to our invention, controlled at the beginning of the water delivery by varying automatically the size of the effective pressures on control and closure members.

According to our invention a cone-plug may be provided as shut-off member.

Figures 1, 3 and 4 are each longitudinal sectional elevations showing three modifications of our invention and Figure 2 is a view of the sprayer displaced laterally to the stationary portion of an air vessel.

Referring to Figures 1 and 2, the nozzle pipe 1 is connected to an air chamber or vessel 2, to which the watering liquid is supplied and which air chamber is adapted to trap air which enters with the fluid. The nozzle-like outlet 3 of the nozzle pipe is shut off by a cone-plug 4 which is connected by a stem 6 passing through a rectifier 5 and an opening 7a in the wall 7 of the nozzle pipe to a pressure-responsive member or piston 8 which moves in the control cylinder 9. The current rectifier comprises a bundle of short tubular sections 5 arranged in circular layers around said stem 6 and between it and the inner wall of the nozzle pipe 1. The function of said tubular sections is to provide a smoother flowing stream by subdividing the current into small parallel streams and thus eliminating the usual whirl of the fluid. Said cylinder 9 is in open communication with the nozzle pipe 1 through opening 7a. Piston 8 thus tends to open closure 4 under the fluid pressure in nozzle pipe 1 and to close it under the pressure of a spring 10, which tends to maintain the cone-plug 4 in the shut-off position as shown in the Figure 1, until the pressure of the liquid has exceeded a predetermined value. By changing the pressure of the spring 10, the pressure required for the opening can be adjusted. A screw 11 serves to change the cross-sectional area of the outlet nozzle during the water delivery.

When the discharge of liquid through outlet 3 is shut off by the cone plug 4, the pressure of the air in air chamber 2 is increased gradually by the inflow of liquid. As the pressure continues to rise, the piston 8 becomes responsive to the rising pressure and overcomes the resistance of spring 10 whereupon the cone plug 4 is retracted from the outlet opening 3. As the liquid begins to discharge through the opening 3, pressure is developed upon the forward surface of the cone plug 4. This pressure counteracts the pressure on the rear surface of said cone plug and thus considerably increases the effect of the pressure on piston 8 within the control chamber 9 before the pressure in said chamber has fallen materially. As a result, the piston snaps rearwardly and produces a sudden opening movement of cone plug 4 to a position corresponding to a maximum opening of the outlet opening 3. With an accelerated discharge of the liquid through the opening 3, the pressure in control chamber 9 drops and thus permits a rapid closing of the cone plug 4 under the action of spring 10. This action is repeated as long as the sprayer is in operation. By adjusting the tension of spring 10, the suddenness as well as the frequency of the nozzle opening operations may be varied at will. At the same time, not only the amount of liquid discharged at each opening of the nozzle may be varied, but also the pressure at which it discharges may be regulated by changing the pressure exerted by spring 10. It will follow, therefore, that the reactionary effects of the repeated discharges which rotate the sprayer head will produce larger or smaller rotary movements of the sprayer depending upon the amounts and velocities of successive discharges.

As will be seen from Fig. 2 the upper portion or section of the nozzle pipe 1, in which the piston 8 and the cone-plug 4 move, is displaced laterally in relation to the lower or stationary section or portion of the air vessel 2. During the opening the kinetic energy of the piston and of the cone-plug is transmitted at rapid blows to the wall of the nozzle pipe and produces thereby a rotation of the nozzle pipe in relation to the air vessel, causing thereby a step-by-step displacement of the sprayer. By changing the tension of spring 10, the pressure under which the nozzle opens may be regulated. When the spring is highly tensioned, then the pressure in the air chamber as well as in the nozzle pipe must rise correspondingly before the spring pressure is overcome by fluid pressure for moving the plug 4 from its seat. When, on the other hand, the spring is weakly tensioned, it is overcome by a correspondingly lower fluid pressure for producing a discharge of fluid. The discharge orifice may be controlled within various limits by means of the screw 11. For example, the screw can be placed in such a position that the plug 4 always remains in open position with respect to the orifice, forming therewith a larger or smaller discharge outlet of ring-shaped cross-section.

In the nozzle pipe 31, shown in Fig. 3, a flap or closure 32 is provided, which is pivotally mounted, as at 33, and is in engagement with the stop 34 in the nozzle pipe in the shut-off position as Figure 3 discloses. The flap 32 is positively connected to a piston 37 through a slotted arm 35 and a rod 36. The piston 37 moves in a cylinder 38, and is under the pressure of a spring 39, counteracted by the fluid pressure in the nozzle pipe through a connecting pipe 38*a*.

Also in this modification the relative areas of the clap 32 and piston 37 are so proportioned that sufficient increase in pressure in the nozzle pipe, will operate the piston for opening the closure 32. As the fluid discharges through the nozzle the fluid pressure in air chamber 2 and nozzle pipe 31 drops and thus permits the spring 39 to return the piston 37 to initial position for again closing the closure 32.

It will be understood from an inspection of Fig. 3 that piston 37 represents a pressure-responsive member acted upon by two opposed pressures which in their relative intensities determine the opening and shutting of the closure. In this embodiment, a formation of eddy currents is avoided by positioning the closure 32 in its open position within a recess 40 of the nozzle pipe so as to present no hinderance to the passage of the water during the delivery.

Figure 4 shows another modification of the control which permits watering of a predetermined area. The nozzle pipe 51 is shut off in this case by a closure in the form of a hollow needle 52 which carries a pressure-responsive member in the form of a control piston 53. A spring 54 acts upon the piston, against the pressure of the fluid in the nozzle pipe and tends to maintain the needle 52 in the position shown in Figure 4. The hollow needle communicates with a cylindrical pressure fluid chamber 57 through a valve opening controlled by a valve 56 which is under the pressure of the spring 55. The space 57 communicates with the nozzle pipe 51 through the tubular connection 58 provided with a throttle valve 59. Said connection 58 communicates with the nozzle pipe through an orifice 61, the amount of flow therethrough being regulated by the throttle valve 59.

With the parts in their relative positions shown in Figure 4, it will be understood that the spring 54 tends to hold said needle 52 in closed position as long as the pressure in air chamber 2 and nozzle pipe 51 is insufficient for starting the spraying action. In this connection, it is to be noted that the quantity of fluid passing through the tubular connection 58 in a unit of time is regulated by the throttle valve 59. The stem 62 of the valve 56 extends through a stuffing box 63 and is provided with screw threads 64 for receiving a thumb nut 65 between which and the wall of chamber 57 is interposed the spring 55. The valve stem 62 can be adjusted endwise in the stuffing box 63 within the limits permitted by the valve seat in needle 52 and the tension of spring 55. With the spraying fluid flowing into the closed nozzle, the pressure rises in air chamber 2, nozzle pipe 51 and chamber 57. The valve 56 which normally closes the opening between the rear end of needle 52 and chamber 57, is adapted to be moved out of its cut-off position shown on the drawing when the pressure rise in chamber 57 overcomes the pressure of spring 55. When this occurs, the fluid discharges under substantially constant pressure from chamber 57 into the interior of needle 52 due to the fact that the throttling effect of the valve 59 reduces the fluid passing through the needle 52 to a considerably smaller current than that discharged from the open nozzle. The flow of fluid through needle 52 causes a pressure drop in chamber 57 and as this pressure in chamber 57 decreases, a point is reached at which said pressure together with the pressure of spring 54 is no longer sufficient to prevent a rearward displacement of piston 53 by the pressure transmitted from nozzle pipe 51 through passage 66 to a pressure chamber 67 formed between the piston 53 and nozzle pipe 51. As the piston 53 continues its nozzle opening movement, it reaches a point where open communication is established between connection 58 and chamber 67 through a by-pass 60 which permits a discharge of fluid from chamber 57 into chamber 67 for the purpose of discharging fluid more rapidly from the chamber 57 and thus to permit a more rapid movement of piston 53 and a quicker opening of the main discharge outlet of the nozzle pipe 51. During this movement, an annular flange 53*a* which is presented rearwardly from the piston 53, cuts off the supply of water to the chamber 57, while the continued discharge of water from said chamber through the pipe 52 produces a rapid drop of pressure in chamber 57 resulting in the closure of valve 56 and a further rapid rearward movement of piston 53 and a full opening of the nozzle. As the nozzle becomes fully opened, there occurs a simultaneous drop in pressure in air chamber 2 and nozzle tube 51 followed by a forward or closing movement of the needle 52 under the action of the spring 54 on piston 53. A repetition of the cycle then begins under a renewed pressure rise in the air chamber and nozzle tube.

With reference to the functioning of the rectifiers 5, it may be noted that the movement of a fluid through a tubular conveyor is retarded by reason of a swirling movement imparted thereto by the curvature of the inner wall of said tubular conveyor. For spraying apparatus in which the range of action is a limited one, the spraying action is good at the discharge outlet of the nozzle for the reason that the fluid is widely distributed. On the other hand, where it is desired to secure a longer range for providing a smoother flowing stream which will hold together for as long as possible after it leaves the nozzle, the rectifier 5 serves a useful function by subdividing the fluid stream into several smaller parallel streams which pass through the discharge outlet passage with the usual whirl substantially eliminated.

It will now be understood that by adjusting the tension of spring 55 and the effective cross-sectional area of the channel 58 or by relative adjustments of both of these variables, the amount of fluid discharging through the hollow needle 52 as well as the duration of such discharges through the needle, may be regulated. In this way, various discharge effects may be secured between the long distance projection of a restricted column of fluid and the widely distributed spraying of a less distant area. These effects may be varied at will, and a refined adjustment of distance and area secured with ease.

We claim as our invention:

1. A spraying device of the character described, said spraying device comprising a nozzle pipe terminating in a discharge nozzle and provided with an air chamber constructed and located at a point close to said nozzle to discharge intermittently into said nozzle pipe at a point close to said discharge nozzle, a closure for said discharge nozzle, said spraying device being provided with a control chamber in constantly open communication with said nozzle pipe and with a pressure chamber, a control piston connected to said closure, said control piston being constructed and arranged to be displaced in one direction by the fluid pressure in said control chamber for moving said closure to outlet opening position, and means for applying a variable pressure to said piston within said pressure chamber in opposition to the pressure of the fluid in said control chamber.

2. In a spraying device of the character described, the combination of a nozzle pipe comprising a fixed section provided with an air chamber constructed and located to discharge intermittently into said nozzle pipe and a revolvable section provided with a discharge outlet, a closure for said discharge outlet, said revolvable section being provided with a control chamber in open communication with said nozzle pipe and with a pressure chamber, a control piston connected to said closure, said control piston being constructed and arranged to be displaced in one direction by the fluid pressure in said control chamber for moving said closure to outlet opening position, and means for applying a variable pressure to said piston within said pressure chamber in opposition to the pressure of the fluid in said control chamber.

3. In a spraying device of the character described, the combination of a nozzle pipe comprising a fixed section provided with an air chamber constructed and located to discharge intermittently into said nozzle pipe and a movable section provided with a discharge outlet, a closure for said discharge outlet, a control chamber in open communication with said nozzle pipe, a pressure chamber, a pressure-responsive member connected to said closure, said pressure responsive member being constructed and arranged to be displaced in one direction by the fluid pressure in said control chamber for moving said closure to outlet opening position, and means for applying a variable pressure to said pressure-responsive device from within said pressure chamber in opposition to the pressure of the fluid in said control chamber.

4. In a spraying device of the character described, the combination of a nozzle pipe comprising an upright section provided with an air chamber constructed and located to discharge intermittently into said nozzle pipe and an elbow section rotatably mounted on said upright section and provided with a discharge outlet, a closure movable into and out of position to completely close said discharge outlet, a control cylinder in open communication at one end with said nozzle pipe, a pressure-responsive member reciprocably mounted in the other end of said control cylinder, a connection between said closure and pressure responsive member, and means for applying a pressure to said pressure-responsive member in opposition to the fluid pressure in said control cylinder.

5. A spraying device of the character described, said spraying device comprising a nozzle pipe terminating in a discharge nozzle and provided with an air chamber constructed and arranged to discharge intermittently into said nozzle pipe at a point close to said nozzle, a closure movable into and out of position to completely close said discharge nozzle, a control cylinder provided with a partition wall intermediately of its ends and in open communication at one end with said nozzle pipe, a pressure responsive piston reciprocably mounted in said partition wall and connected to said closure, and a compression spring interposed between said piston and the other end of said cylinder.

6. A spraying device of the character described, said spraying device comprising a nozzle pipe terminating in a discharge nozzle and provided with an air chamber constructed and arranged to discharge intermittently into said nozzle pipe at a point close to said nozzle, a closure movable into and out of position to completely close said discharge nozzle, a control cylinder connected to said nozzle pipe, a piston reciprocable in said control cylinder, a compression spring interposed between said piston and one end of said control cylinder, an operating connection between said piston and said closure, and a tubular connection leading from said nozzle pipe to the space between said piston and the other end of said cylinder.

7. A spraying device of the character described, said spraying device comprising a nozzle pipe provided with a discharge outlet and with an air chamber constructed and located to discharge intermittently into said nozzle pipe, a closure movable into and out of position to completely close said discharge outlet, a control cylinder in open communication with said nozzle pipe, a piston reciprocable in said control cylinder, a compression spring interposed between said piston and the end wall of said control cylinder, a tubular needle extending through said piston and having one end suitably formed to fit snugly against the inner wall of said discharge outlet and its other end provided with an opening, a valve for said opening, said valve being provided with means yieldably retaining it in closed position with respect to said opening, and a tubular connection extending between said nozzle pipe and the space between said piston and the end wall of said control cylinder, said tubular connection being provided with a throttle for regulating the resistance of said tubular connection to fluid passing therethrough.

8. A spraying device of the character described, said spraying device comprising a nozzle pipe provided with a discharge outlet and with an air chamber constructed and located to discharge intermittently into said nozzle pipe, a closure for said discharge outlet, said spraying device being provided with a control chamber in open communication with said nozzle pipe and with a pressure chamber, both of said chambers being coaxially arranged with respect to said discharge outlet, a control piston provided with a stem by which it is connected to said closure, said control piston being partly housed in each of said chambers, a plurality of current-rectifying tubes arranged within said nozzle pipe in circular series around said stem and between said discharge outlet and said control chamber, and means for applying a variable pressure to said piston from within said pressure chamber in opposition to the pressure of the fluid in said control chamber.

9. A spraying device for watering land and the like comprising a conduit provided with a discharge nozzle, a pressure accumulator connected to said conduit close to said nozzle and in constant open communication with said conduit and adapted to alternately store fluid therein and discharge it into said conduit, a source of fluid under pressure in constant open communication with said conduit, a closure for said discharge nozzle, means yieldably urging the closure to closed position, and means associated with said closure constructed and arranged to be operated by the pressure of fluid accumulated in said accumulator and conduit when said pressure reaches a predetermined amount to overcome said yieldable means and move said closure to open position to permit discharge of accumulated fluid, the resultant fall in pressure enabling said yieldable means to return the closure to closed position to permit a repetition of the cycle.

10. In the combination as defined in claim 9, said nozzle being eccentrically pivoted and extending tangentially to the pivotal axis so that a portion of the force of the issuing stream effects rotation of the nozzle.

11. A spraying device for watering land and the like comprising a conduit provided with a discharge nozzle, a pressure accumulator connected to said conduit close to said nozzle and in constant open communication with said conduit and adapted to alternately store fluid therein and discharge it into said conduit, a source of fluid under pressure in constant open communication with said conduit, a closure for said discharge nozzle arranged beyond the point of connection of said pressure accumulator with said conduit, means yieldably urging the closure to closed position, and means associated with said closure constructed and arranged to be operated by the pressure of fluid accumulated in said accumulator and conduit when said pressure reaches a predetermined amount to overcome said yieldable means and move said closure to open position to permit discharge of accumulated fluid, the resultant fall in pressure enabling said yieldable means to return the closure to closed position to permit a repetition of the cycle.

12. A spraying device for watering land and the like adapted to be connected with a source of water under pressure comprising a nozzle provided with a discharge outlet, a pressure accumulator connected to said device adjacent to said nozzle and adapted to alternately store fluid therein and discharge it into said device, a closure for said discharge outlet in the form of a reciprocable valve, means yieldably urging the closure to closed position, and means associated with said closure constructed and arranged to be acted upon by the pressure of fluid accumulated in said device when said pressure reaches a predetermined amount to overcome said yieldable means and move said closure to open position to permit discharge of accumulated fluid, the resultant fall in pressure enabling said yieldable means to return the closure to closed position to permit a repetition of the cycle, said last-enumerated means comprising a surface formed on said valve and facing in a direction to permit fluid to act on the valve in opposition to said yieldable closing means.

13. A spraying device for watering land and the like comprising a conduit connected to a source of water under pressure and having a discharge nozzle, a pressure accumulator in communication with said conduit adjacent to said nozzle and a valve fitted in and closing the nozzle, means for yieldingly urging the valve to closed position and means associated with said valve adapted to be actuated by the pressure of the water in said conduit for opening the valve.

14. In the combination as defined in claim 13, said accumulator being arranged concentrically about said conduit.

15. In the combination as defined in claim 13, said valve being provided with a part exposed to water pressure upon opening of the valve tending to hold the valve off of its seat.

16. A spraying device for watering land and the like comprising a conduit connected to a source of water under pressure and having a discharge nozzle, a pressure accumulator in communication with said conduit adjacent to said nozzle, a valve adapted to seat in and close the nozzle and having a stem extending through the conduit, means engaging the stem of the valve and yieldingly urging it into closed position, said stem being provided with an unbalanced surface exposed to the action of the water for urging the valve toward open position when the pressure in the conduit reaches a predetermined value.

17. A spraying device for watering land and the like comprising a conduit connected to a source of water under pressure and having a discharge nozzle, a pressure accumulator in communication with said conduit adjacent to said nozzle, a needle valve arranged to seat in and close the nozzle and having a stem extending into the conduit and through a wall thereof, yielding means engaging the portion of the stem outside of said nozzle urging the valve to closed position, said stem being provided with an unbalanced surface exposed to the action of water in said conduit for urging the valve to open position when the pressure in the conduit reaches a predetermined value.

18. A spraying device comprising a conduit adapted to be connected to a source of water under pressure, a pressure accumulator in constant open communication with said conduit, said conduit being provided with a discharge nozzle, a needle valve closing said nozzle having a stem extending along the conduit and through the wall thereof, and a spring connected to the stem urging the needle valve toward closed position, said valve having a part exposed to the pressure of the water in the conduit tending to move the valve toward open position and having a longitudinal passage therein discharging at one end through said nozzle, a spring-pressed valve closing the other end of said passage, and a pipe supplying water from said conduit to the other side of said part and to said spring-pressed valve.

19. A spraying device for watering land and the like comprising a conduit connected to a source of water under pressure and having a discharge nozzle, a pressure accumulator arranged concentrically about said conduit and in communication with said conduit adjacent said nozzle, a valve fitted in and closing the nozzle, means for yieldingly urging the valve to closed position, means associated with said valve adapted to be actuated by the pressure of the water in said conduit for opening the valve, said nozzle being mounted for rotary movement, and means actuated by discharge of water through the nozzle for effecting rotation thereof.

20. A spraying device for watering land and the like comprising a conduit connected to a source of water under pressure and having a discharge nozzle, a pressure accumulator in communication with said conduit adjacent said nozzle, a valve arranged to seat in and close the nozzle and having a stem extending into the conduit and through a wall thereof, yielding means engaging the portion of the stem outside of said nozzle urging the valve to closed position, said stem being provided with an unbalanced surface exposed to the action of water in said conduit for urging the valve to open position when the pressure in the conduit reaches a predetermined value, said nozzle being mounted for rotary movement and extending tangentially with respect to its axis of rotation so as to effect its own rotation by reaction.

21. In the combination as defined in claim 9, said nozzle with its closure and closure operating means constituting a sub-assembly pivoted for rotation about the axis of said conduit and said nozzle extending tangentially to said axis so that a portion of the force of the issuing stream rotates the nozzle.

22. A self-contained spraying device for watering land and the like, said device being adapted to be moved about as a unit and comprising a conduit adapted to be connected to a source of fluid under pressure, a pressure accumulator in communication with said conduit, a nozzle in close fluid communication with said accumulator to discharge fluid therefrom, a valve arranged to control the discharge of fluid from the conduit and pressure accumulator through said nozzle, yielding means to normally hold the valve closed, and means associated with said valve adapted to be actuated by the pressure of fluid in said conduit for opening the valve, the fluid-holding capacity of said device on the discharge side of said accumulator being relatively small so that the pressure stored in the accumulator is sufficient to project the water a considerable distance by ram action when the valve is open.

23. In the combination as defined in claim 22, said nozzle and valve being mounted for rotary movement on said conduit.

24. In the combination as defined in claim 22, said nozzle and valve being mounted for rotary movement on said conduit, and means actuated by discharge of water through the nozzle for effecting rotation thereof.

WILM KIND.
GUSTAV SCHENK.
HUGO RICHARD BUSCH.